United States Patent
Forenz et al.

(10) Patent No.: US 10,730,125 B2
(45) Date of Patent: Aug. 4, 2020

(54) APPARATUS AND METHOD FOR MAKING EXTRUSION DIES

(71) Applicant: Corning Incorporated, Corning, NY (US)

(72) Inventors: Dominick John Forenz, Hammondsport, NY (US); Mark Lee Humphrey, Burdett, NY (US); Kenneth Richard Miller, Addison, NY (US); John Charles Rector, Beaver Dams, NY (US); Gregg Lee Shugars, Savona, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/529,370

(22) PCT Filed: Nov. 20, 2015

(86) PCT No.: PCT/US2015/061731
§ 371 (c)(1),
(2) Date: May 24, 2017

(87) PCT Pub. No.: WO2016/085782
PCT Pub. Date: Jun. 2, 2016

(65) Prior Publication Data
US 2017/0266743 A1    Sep. 21, 2017

Related U.S. Application Data

(60) Provisional application No. 62/084,915, filed on Nov. 26, 2014.

(51) Int. Cl.
*B23H 3/04*    (2006.01)
*B23H 7/22*    (2006.01)
(Continued)

(52) U.S. Cl.
CPC .................. *B23H 3/04* (2013.01); *B23H 7/22* (2013.01); *C25F 3/00* (2013.01); *B23H 2200/30* (2013.01);
(Continued)

(58) Field of Classification Search
None
See application file for complete search history.

(56) References Cited

U.S. PATENT DOCUMENTS

| 3,723,268 A | 3/1973 | Johns et al. |
| 5,630,951 A | 5/1997 | Peters |

(Continued)

FOREIGN PATENT DOCUMENTS

| CN | 1592674 A | 3/2005 |
| CN | 102933279 A | 2/2013 |

(Continued)

OTHER PUBLICATIONS

He et al. "Electrochemical machining of micro slots using shaped electrode" 2012, Advanced Materials Research, pp. 315-319.
(Continued)

*Primary Examiner* — Brian W Cohen
(74) *Attorney, Agent, or Firm* — Kurt R. Denniston

(57) ABSTRACT

An apparatus and method to machine cavities in die blanks having little to no taper. The apparatus includes an electrode tool (200) including intersecting walls coated with electrically insulating coating (258), an erosion face (204) comprising a cross section of the walls exposed through the electrically insulating coating, and a channel formed by the walls to supply electrolyte to the erosion face, the channels defined by interior surfaces of the walls and having an opening formed by edges of the erosion face. The method includes pulsed electrochemical machining a work piece with the electrode tool.

11 Claims, 13 Drawing Sheets

(51) Int. Cl.
  *C25F 3/00*    (2006.01)
  *B29C 48/11*   (2019.01)
  *B29C 48/30*   (2019.01)
  *B28B 3/26*    (2006.01)

(52) U.S. Cl.
  CPC ............ *B28B 3/26* (2013.01); *B28B 3/269* (2013.01); *B29C 48/11* (2019.02); *B29C 48/30* (2019.02); *B29C 48/3001* (2019.02)

(56) References Cited

U.S. PATENT DOCUMENTS

| | | | |
|---|---|---|---|
| 5,759,362 | A | 6/1998 | Van Kessel et al. |
| 6,080,348 | A | 6/2000 | Shalkey |
| 6,299,813 | B1 | 10/2001 | Brew et al. |
| 6,320,150 | B1 | 11/2001 | Hironaga |
| 6,570,119 | B2 | 5/2003 | Marcher |
| 6,589,402 | B2 | 7/2003 | Irie et al. |
| 6,621,034 | B2 | 9/2003 | Shibagaki et al. |
| 6,696,132 | B2 | 2/2004 | Beall et al. |
| 6,803,087 | B2 | 10/2004 | Brew et al. |
| 7,335,848 | B2 | 2/2008 | Hironaga et al. |
| 7,416,652 | B2 | 8/2008 | Oelsch |
| 7,850,831 | B2 | 12/2010 | Luo |
| 7,964,086 | B2 * | 6/2011 | Bayer .............. B23H 3/06 205/649 |
| 7,982,158 | B2 | 7/2011 | Koishikura et al. |
| 8,076,057 | B2 | 12/2011 | Despa et al. |
| 8,778,147 | B2 | 7/2014 | Wei et al. |
| 2009/0008264 | A1 | 1/2009 | McGee et al. |
| 2009/0081325 | A1 * | 3/2009 | Kitamura .............. B23H 1/04 425/461 |
| 2010/0051475 | A1 | 3/2010 | Eto et al. |
| 2010/0305900 | A1 | 12/2010 | Folmar et al. |
| 2011/0049107 | A1 * | 3/2011 | Humphrey .......... B23H 1/04 219/69.15 |
| 2012/0175349 | A1 | 7/2012 | Hayashi et al. |
| 2012/0217163 | A1 | 8/2012 | Collins et al. |
| 2012/0285820 | A1 * | 11/2012 | Li .................... B23H 3/10 204/227 |

FOREIGN PATENT DOCUMENTS

| | | |
|---|---|---|
| EP | 2011597 A2 | 1/2009 |
| EP | 2465628 A1 | 6/2012 |
| JP | 63140683 A | 6/1988 |
| JP | 02114430 U | 9/1990 |
| JP | 9285917 A | 11/1997 |

OTHER PUBLICATIONS

Shibuya et al. "Electrochemical machining of tungsten carbide alloy micro-pin with NaNO3 solution" 2012, International Journal of Precision Engineering and Manufacturing, pp. 2075-2078.

Swain, "Preperation of coated microtools for electrochemical machining applications" University of Nebraska—Lincoln, A Thesis. Aug. 2010. 141 pgs.

Zu and Zhu, "Investigation on precision ECM of micro multi-grooves" 2004, China Mechanical Engineering, pp. 1912-1915.

International Search Report and Written Opinion PCT/US2015/061731 dated Feb. 11, 2016.

English Translation of CN201580074487.0 Office Action dated Jun. 21, 2018; 12 Pages; Chinese Patent Office.

English Translation of JP2017528489 Office Action dated Oct. 24, 2018, Japan Patent Office, 7 Pgs.

Japanese Patent Application No. 2017528489; Notice of Allowance dated Mar. 4, 2020; Japan Patent Office; 3 Pgs.

* cited by examiner

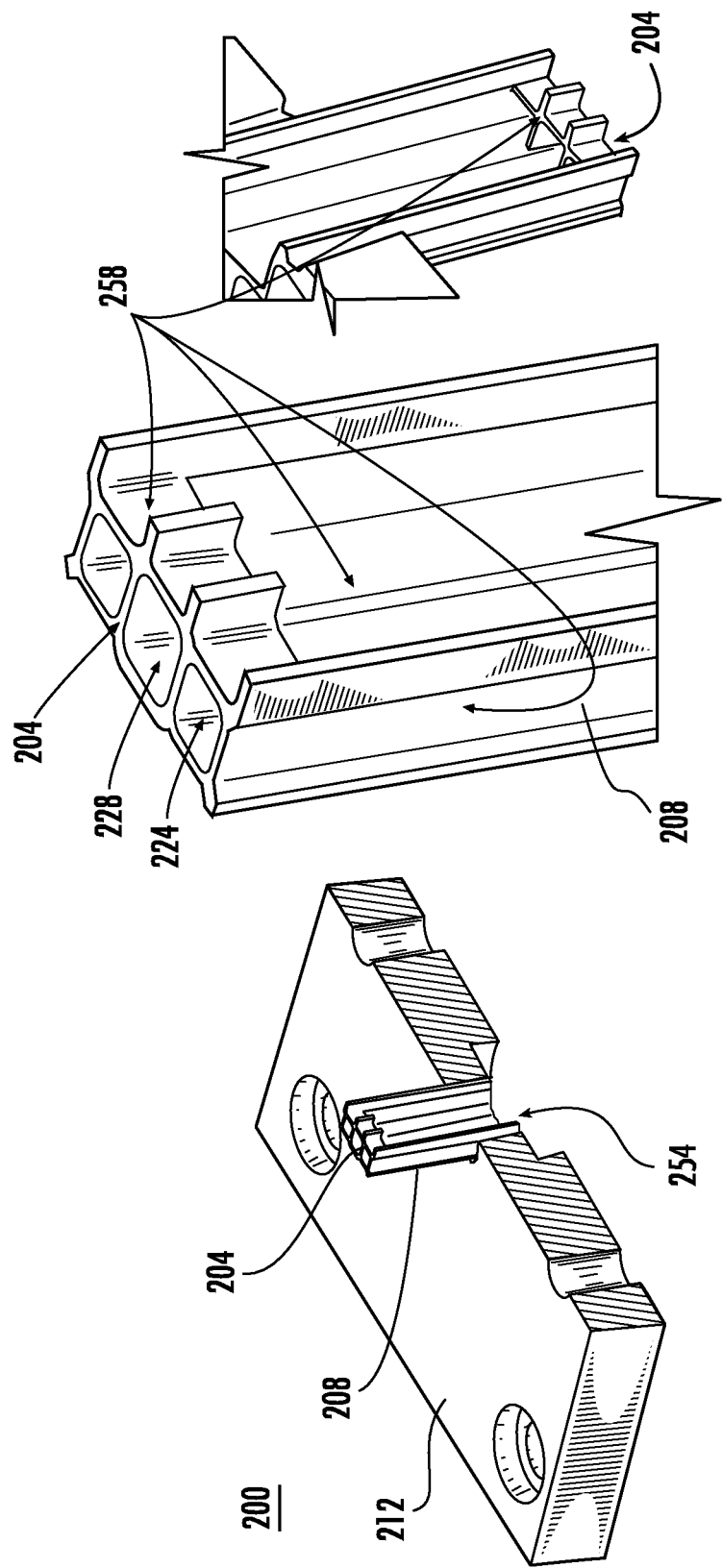

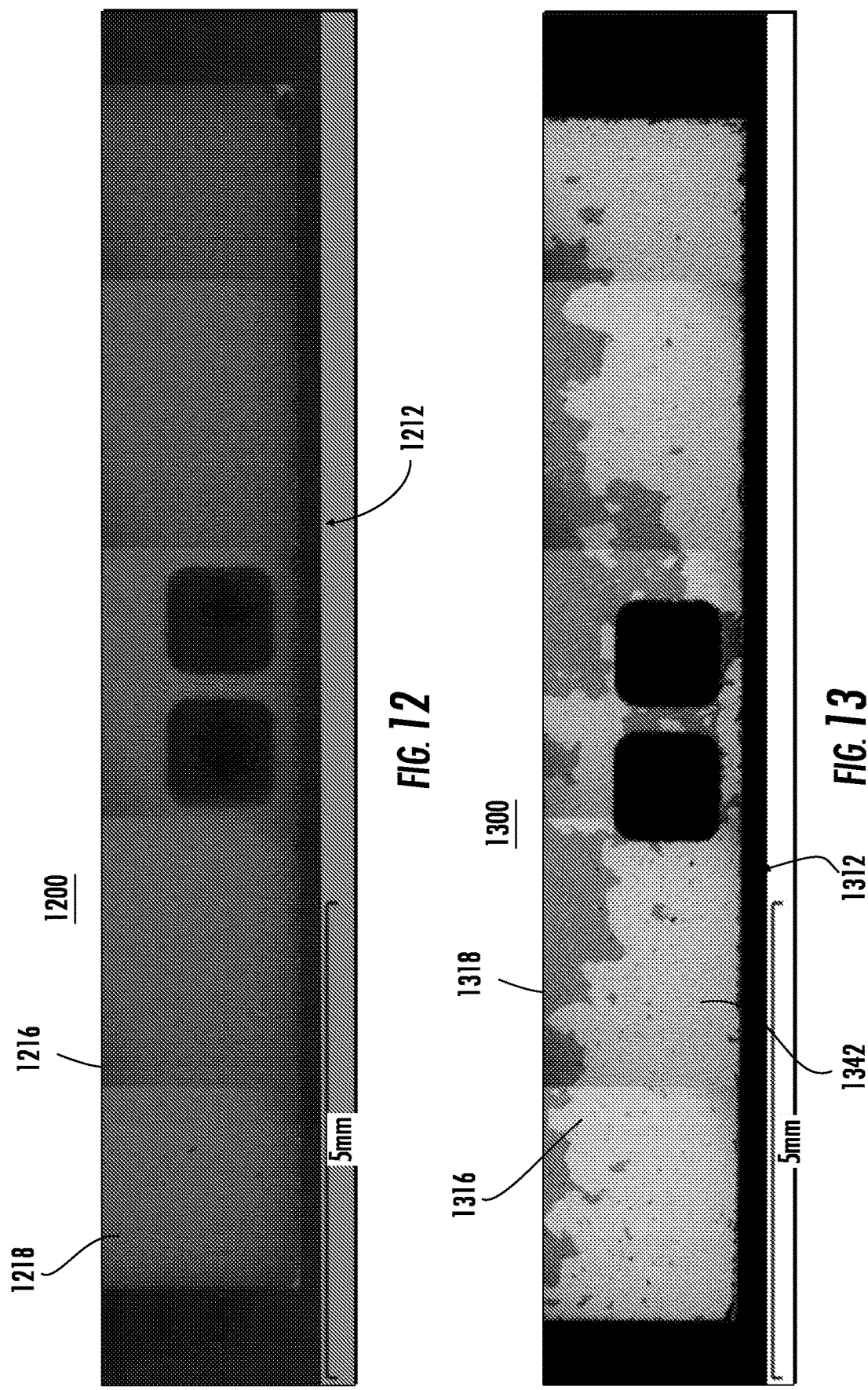

APPARATUS AND METHOD FOR MAKING EXTRUSION DIES

CROSS REFERENCE TO RELATED APPLICATION

This application is a national stage application under 35 U.S.C. § 371 of International Application No. PCT/US2015/61731, filed on Nov. 20, 2015, which claims the benefit of and priority to U.S. Provisional Patent Application Ser. No. 62/084,915 filed on Nov. 26, 2014, the contents of these applications are relied upon and incorporated herein by reference in their entireties.

BACKGROUND

Field

Exemplary embodiments of the present disclosure relate to apparatus and methods for making extrusion dies, more particularly, to apparatus and methods for machining cavities in the manufacturing of honeycomb extrusion dies.

Discussion of the Background

After-treatment of exhaust gas from internal combustion engines may use catalysts supported on high-surface area substrates and, in the case of diesel engines and some gasoline direct injection engines, a catalyzed filter for the removal of carbon soot particles. Porous ceramic flow-through honeycomb substrates and wall-flow honeycomb filters may be used in these applications.

Extrusion dies may be used in manufacturing ceramic honeycomb bodies. Conventional extrusion dies for forming ceramic honeycomb bodies (cellular ceramic products) typically have a series of holes on one side of a metal plate intersecting a series of slots, forming pins, which can have various geometric cross sections such as squares, hexagons, or the like on the opposite side of the metal plate. In order to form the cellular ceramic products, raw material, i.e. batch, is pushed into the hole side of the metal plate and exits the slot side of the metal plate, forming the cellular shape by being extruded through the slots and around the pins.

A variety of machining methods can be used to create this tooling geometry, depending on dimensions and design of the extrusion dies. For the machining of the holes, drilling, twist drilling, gun drilling, and shape tube electrolytic machining (STEM) may be used. For the machining of the slots, abrasive wheel grinding, wire electrical discharge machining (wEDM), wheel slitting and/or plunge electrical discharge machining (pEDM) may be used. After machining, the surfaces of the extrusion dies may be coated with a wear resistant material to improve the life of the extrusion dies.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide an electrode tool to machine die cavities.

Exemplary embodiments of the present disclosure also provide a plunge pulse electrochemical machining (pECM) apparatus to machine die cavities.

Exemplary embodiments of the present disclosure also provide a method of machining die cavities.

Additional features of the disclosure will be set forth in the description which follows, and in part will be apparent from the description, or may be learned by practice of the disclosure.

An exemplary embodiment discloses a pulse electrochemical machining (pECM) electrode tool to machine extrusion die cavities. The electrode tool includes a plurality of intersecting walls extending from a base to an open end, an electrically insulating layer disposed on the plurality of intersecting walls, an erosion face comprising a cross section of the walls exposed through the electrically insulating coating at the open end, and a channel formed by the plurality of intersecting walls.

An exemplary embodiment also discloses a pulse electrochemical machining (pECM) tool, comprising an electrode having a distal end, the electrode being comprised of an inner wall, an outer wall, and an electrically insulating coating covering at least a portion of at least one of the outer wall and the inner wall, and wherein the inner wall defines an electrolyte chamber, the coating material is selected from the group parylene, amorphous silicon, modified amorphous silicon with silicon base coating, modified amorphous silicon without silicon base coating, Polysiloxane, and metal oxide coatings such as alumina and titania.

An exemplary embodiment also discloses a method of forming a die from a work piece using the pECM tool. The method includes machining a cavity into the work piece to a cavity depth, wherein the width of the cavity varies by less than 20% along the cavity depth.

An exemplary embodiment also discloses a pulse electrochemical machining (pECM) tool comprising an electrode having a distal end. The electrode being comprised of an inner wall, an outer wall, and an electrically insulating coating covering the outer wall to within a distance "d" of the distal end, wherein the outer wall and the inner wall define a wall thickness "t" at the distal end, and the ratio d/t<0.5 and wherein the inner wall defines an electrolyte chamber, wherein the coating material is selected from the group parylene, amorphous silicon, modified amorphous silicon with silicon base coating, modified amorphous silicon without silicon base coating, polysiloxane, and metal oxide coatings such as alumina and titania.

An exemplary embodiment also discloses a pulse electrochemical machining (pECM) tool comprising an electrode having a distal end, the electrode being comprised of an inner wall, an outer wall, an electrically insulating coating covering the outer wall to within 2 mm or less of the distal end.

It is to be understood that both the foregoing general description and the following detailed description are exemplary and explanatory and are intended to provide further explanation of the disclosure.

BRIEF DESCRIPTION OF THE FIGURES

The accompanying drawings, which are included to provide a further understanding of the disclosure and are incorporated in and constitute a part of this specification, illustrate exemplary embodiments of the disclosure, and together with the description serve to explain the principles of the disclosure.

FIG. 3 illustrates a cutaway view of the electrode tool of FIG. 2A according to exemplary embodiments of the disclosure.

FIG. 12 is a side view of an Example cathode tool after coating and before testing in the pulsed electrochemical machining method and apparatus according to exemplary embodiments of the disclosure.

FIG. 13 is a side view of the Example cathode tool of FIG. 12 after testing in the pulsed electrochemical machining method and apparatus according to exemplary embodiments of the disclosure.

DETAILED DESCRIPTION

Figure 1:
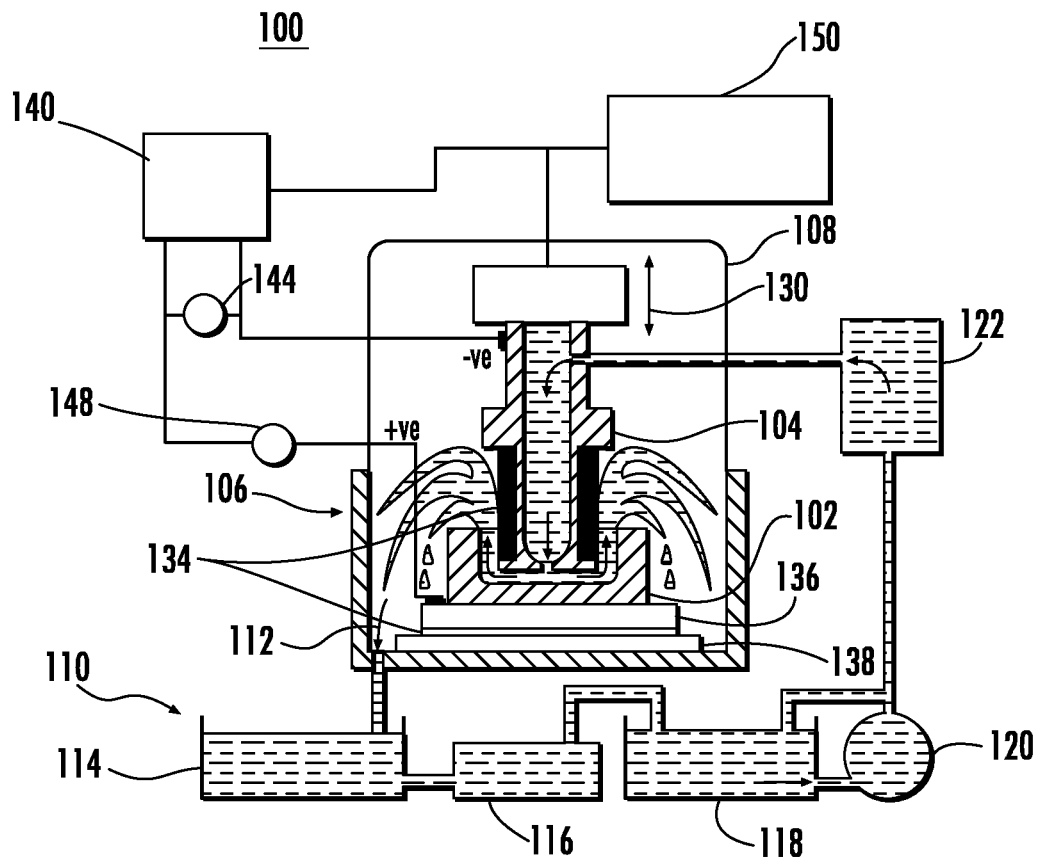
FIG. 1 is a schematic diagram of a pulsed electrochemical machining apparatus according to exemplary embodiments of the disclosure.

The manufacture of porous ceramic honeycomb bodies may be accomplished by the process of plasticizing ceramic powder batch mixtures, extruding the mixtures through honeycomb extrusion dies to form honeycomb extrudate, and cutting, drying, and firing the extrudate to produce ceramic honeycomb bodies of high strength and thermal durability having channels extending axially from a first end face to a second end face. As used herein a ceramic honeycomb body includes ceramic honeycomb monoliths and ceramic segmented honeycomb bodies, including the segments thereof.

A co-extruded or an after-applied exterior skin may form an outer axial peripheral surface of the ceramic honeycomb bodies. Each channel of the honeycomb bodies, whether monolithic or segmented, can be plugged at an inlet face or an outlet face to produce a filter. When some channels are left unplugged a partial filter can be produced. The honeycomb body, whether monolithic or segmented, can be catalyzed to produce a substrate. Further, filters and partial filters can be catalyzed to provide multi-functionality. The ceramic honeycomb bodies thus produced are widely used as ceramic catalyst supports in motor vehicle exhaust systems, and as catalyst supports and wall-flow particulate filters for the removal of soot and other particulates from engine exhausts.

Among the commercially successful processes for ceramic honeycomb manufacture are those that utilize large co-rotating twin screw extruders for the mixing and extruding of ceramic honeycomb extrudate. Ram extrusion, pressing, casting, spraying and 3-dimensional printing are other processes for ceramic honeycomb manufacture.

Exemplary embodiments of the disclosure provide an electrode tool to machine die cavities for extrusion dies to be used in manufacture of ceramic honeycomb bodies. Exemplary embodiments of the disclosure also provide a plunge pulse electrochemical machining (pECM) apparatus having the electrode tool to machine die cavities for extrusion dies to be used in manufacture of ceramic honeycomb bodies. Exemplary embodiments of the disclosure also provide a method of machining die slots for extrusion dies to be used in manufacturing of ceramic honeycomb bodies using the plunge pECM apparatus having the electrode tool. According to these exemplary embodiments, an apparatus and method are provided that machine or cut cavities in die blanks having little to no taper.

Wire electrical discharge machining (wEDM) has been used to machine slots, pins, and geometric features in honeycomb extrusion dies for extrusion die designs employing straight line-of-sight slots for the traveling wire of the wEDM process, as described, for example, in U.S. Pat. Nos. 5,630,951, 6,621,034, and 6,320,150, the entire contents of which are incorporated by reference as if fully set forth herein. This technology also enabled the machining of various geometric features on the sides of the machined pins using wEDM. The inclusion of these various geometric features enabled improvements in ceramic batch flow stability and uniformity, leading to the manufacture of honeycombs having increased strength, as described, for example, in U.S. Pat. Nos. 6,080,348 and 6,299,813, the entire contents of which are incorporated by reference as if fully set forth herein. Lower production costs were also achieved through shorter firing cycles enabled by increased honeycomb strength.

However, ceramic honeycomb designs consisting of varying pin sizes, as described, for example, in U.S. Pat. No. 6,696,132 the entire content of which is incorporated by reference as if fully set forth herein, or non-squares shapes, such as round, hex, etc., are formed by extrusion dies not having straight line-of-sight slots. Such die designs are not suitable for machining using wEDM. Plunge electrical discharge machining (pEDM) using a formed electrode can be used for these die designs as described, for example, in U.S. Pat. Nos. 6,570,119, 7,335,848, and 7,982,158, the entire contents of which are incorporated by reference as if fully set forth herein. Modifications to existing extrusion dies, for example to alter slot width and/or pin shape in the area that forms the periphery of the honeycomb, are completed using plunge EDM as described, for example, in U.S. Pat. No. 6,803,087, the entire content of which is incorporated by reference as if fully set forth herein.

However, plunge EDM as a technology used to fabricate and/or modify extrusion dies, may have a number of issues. For instance, costly high-precision electrodes are required, which are consumed by the process. There is no allowance for adding the desired geometric features on pin sides using pEDM techniques, so the use of shorter and therefore less-costly production firing cycles is not available with this approach. Both wEDM and pEDM are spark erosion processes which alter the base metallurgical properties of the extrusion die blanks and thus the extrusion dies in the machined areas. This leads to undesired surface finish roughness that can cause extrusion die wear coating adherence issues and ceramic batch flow non-uniformity during honeycomb extrusion. Also, secondary discharge during plunge EDM between the electrode sidewalls and pins produces pin taper and a loss in extrusion die geometric precision and uniformity, increasing variability in honeycomb dimensions and strength. This results in higher manufacturing costs due to lower production throughput. Further, micro-cracking in the die can occur during EDM which can initiate material failure resulting in catastrophic pin loss from the die face.

The use of pECM technology offers a more efficient and economical honeycomb extrusion die fabrication technology. In pECM, the electrode shape mirrors that of the desired cavity and serves as a cathode in an electrolytic cell, while the work piece is the anode. The cathode is reciprocated as it is fed downward, with precise power pulsing time delivery of current to improve accuracy. Material removal is through electrolytic dissolution, similar to conventional electroplating, but reversed. In some embodiments there are no thermal or mechanical stresses imparted to the work piece, and a very smooth surface finish is obtainable.

FIG. 1 presents a diagram of a plunge pECM apparatus 100 according to exemplary embodiments of the disclosure. Plunge pECM uses a computer numerical controlled (CNC) high precision machine tool. As illustrated schematically in FIG. 1, pECM works by applying a potential across a work piece electrode 102 (for example, a die blank) and an electrode tool 104 in an electrolytic cell 106. In FIG. 1, an enclosure 108 houses the work piece electrode 102 and the electrode tool 104 in the electrolytic cell 106. In some exemplary embodiments the work piece electrode 102 can be the anode and the electrode tool 104 can be the cathode in the electrolytic cell 106.

An electrolyte management system 110 for the electrolytic cell 106 provides an electrolyte path for the electrolyte 112. The electrolyte management system 110 can include a first reservoir 114, a first filtration membrane 116 to remove particles, a second electrolyte reservoir 118 to contain the filtered electrolyte, a pump 120 to circulate the electrolyte 112 through the electrolyte path and to the electrolytic cell 106 and a second filtration membrane 122 prior to the electrolyte 112 supplying the electrode tool 104. The electrolyte path can be a closed loop. The electrolyte management system 110 also provides various piping, tubing, pH monitoring and control, and temperature monitoring and control to maintain consistent electrolyte conductivity.

A power supply 140 provides the DC potential (voltage) to the electrodes 102, 104 in the pECM apparatus 100 according to exemplary embodiments of the disclosure. A voltmeter 144 and an ammeter 148 may be used to monitor the voltage and the current, respectively, supplied to the electrodes, 102, 104 during the pECM machining. The power supply 140 also provides power to the machine motion controller 150 to control the electrode tool oscillator 130. The electrode tool oscillation along with power and pulse timing is precisely monitored and controlled.

Figure 2A:
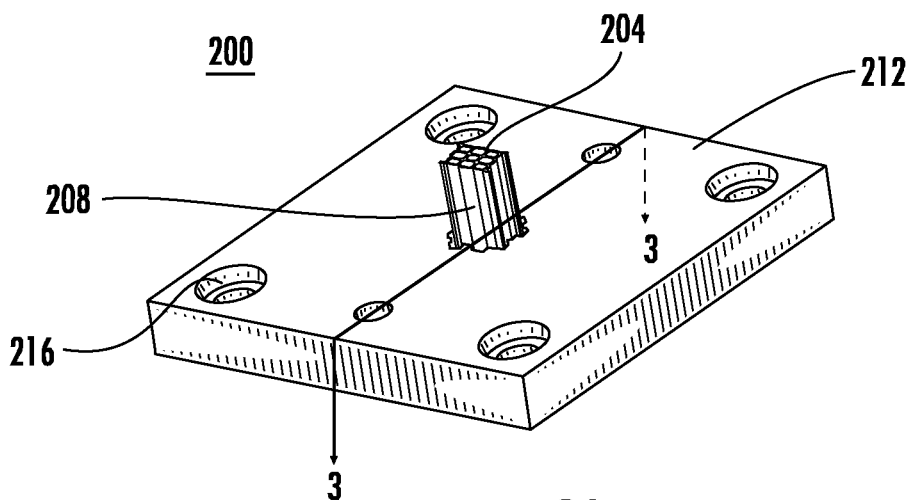
FIG. 2A is a schematic perspective view of an electrode tool of a pulsed electrochemical machining apparatus according to exemplary embodiments of the disclosure.

FIG. 2A is a schematic perspective view of an electrode tool 200 of a pECM apparatus 100 according to exemplary embodiments of the disclosure. The electrode tool 200 includes a machining face, erosion face, or cutting face 204 at an open end of intersecting walls 208. The cutting face 204 is referred to herein interchangeably as machining face, erosion face, and the like, at the distal end of the electrode tool 200. The intersecting walls 208 form channels therebetween and extend from a base 212. The channels provide a conduit for electrolyte from a chamber or tube at the back surface of the base 212 to the openings at the erosion face where the front surface of the base 212 is shown in FIG. 2A. Bolt, alignment, pin holes, or the like 216 may be provided in the base 212 to align and attach the electrode tool to the pECM apparatus 100. According to exemplary embodiments of the disclosure the cathode (or tool electrode) used in the pECM apparatus 100 can be a negative image of the cavity being machined. The cathode shown schematically in FIG. 2A can be used to machine slots and pins with geometric features in an extrusion die for asymmetric channel technology (ACT), where an ACT extruded honeycomb body would have alternating small (outlet) and large (inlet) channels.

Figure 2B:
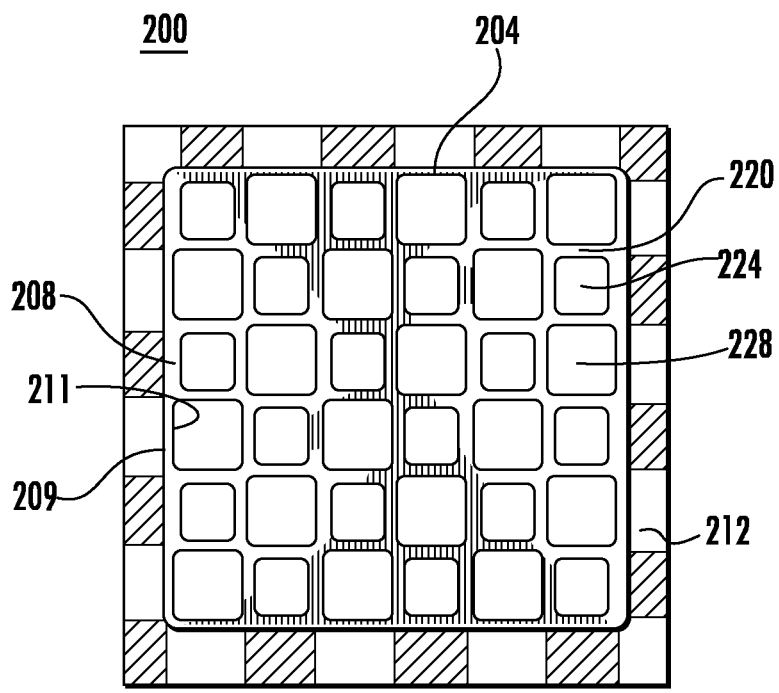
FIG. 2B is an end view of a face of an electrode tool of a pulsed electrochemical machining apparatus according to exemplary embodiments of the disclosure.

FIG. 2B is an end view of the machining face 204 of the electrode tool 200 of FIG. 2A. The cross sections 220 of the intersecting walls 208 at the machining face 204 provide the current to the electrolyte in the vicinity of the work piece electrode 102 to perform the machining of the work piece 102. The electrode 200 includes small channels 224 and large channels 228 that provide small pins and large pins in the work piece 102 as the negative image of the electrode 200. The small channels 224 and large channels 228 also provide electrolyte through openings at the machining face 204 of the electrode tool 200.

Figure 2C:
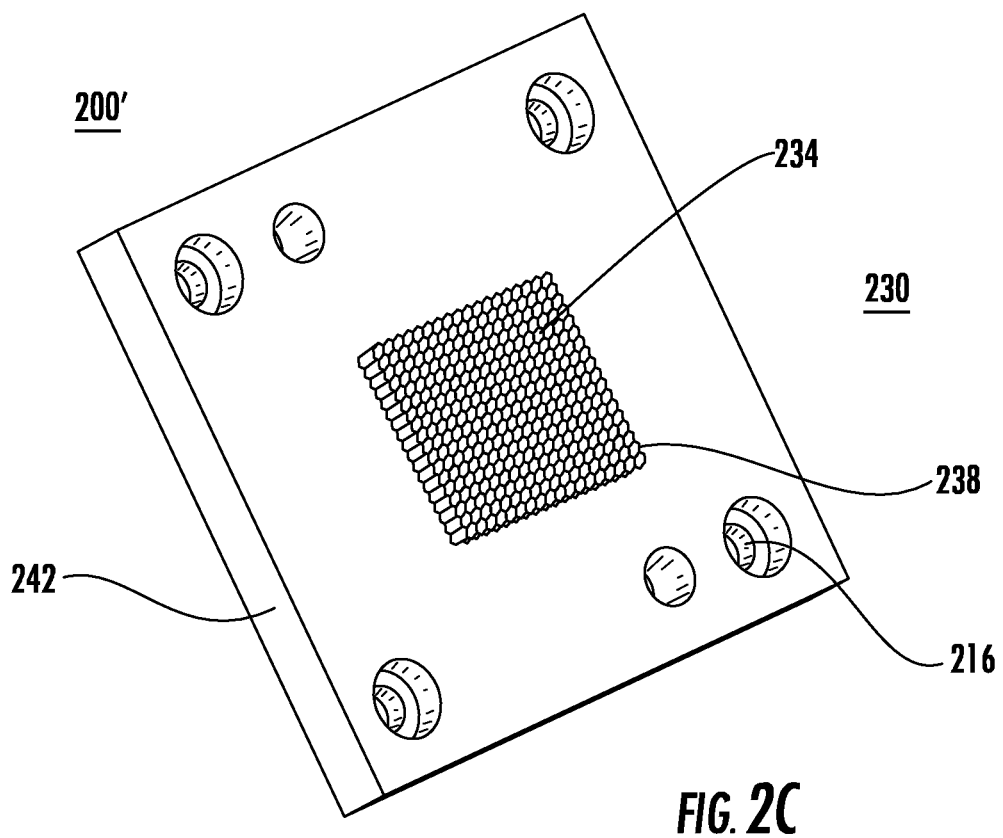
FIG. 2C is a schematic perspective view of an electrode tool of a pulsed electrochemical machining apparatus according to exemplary embodiments of the disclosure.

FIG. 2C is a schematic perspective view of an electrode tool 200' of a pECM apparatus 100 according to exemplary embodiments of the disclosure. The electrode tool 200' includes a machining face, erosion face, or cutting face 234 at an open end referred to herein as a distal end of intersecting walls 238. The intersecting walls 238 form channels therebetween and extend from a base 242. The channels provide a conduit for electrolyte from a chamber or tube at the back surface of the base 242 to the openings at the erosion face 234 where the front surface of the base 242 is shown in FIG. 2C. Bolt, alignment, pin holes, or the like 216 may be provided in the base 212 to align and attach the electrode tool 200' to the pECM apparatus 100. According to exemplary embodiments of the disclosure the cathode (or tool electrode) used in the pECM apparatus 100 can be a negative image of the cavity being machined. The cathode 200' shown schematically in FIG. 2C can be used to machine slots and pins with geometric features in an extrusion die for hexagonal technology, where a honeycomb body extruded through a die having the slots and pins machined with the cathode 200' would have hexagonal channels.

Figure 2D:
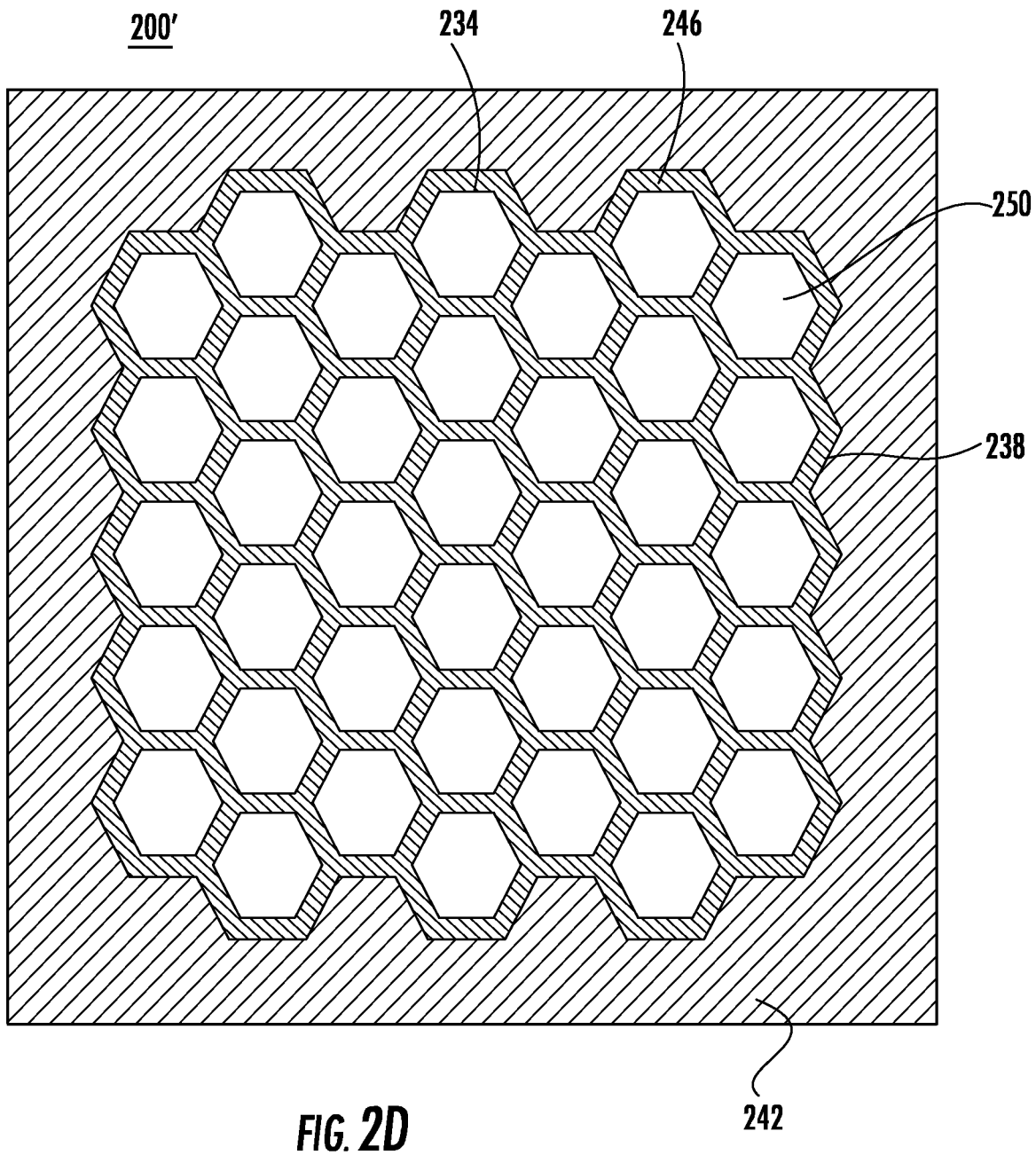
FIG. 2D is an end view of a face of an electrode tool of a pulsed electrochemical machining apparatus according to exemplary embodiments of the disclosure.

FIG. 2D is an end view of the machining face 234 of the electrode tool 200' of FIG. 2C. The cross sections 246 of the intersecting walls 238 at the machining face 234 provide the current to the electrolyte in the vicinity of the work piece electrode 102 to perform the machining of the work piece 102. The electrode 200' includes hexagonal channels 250 that provide hexagonal pins in the work piece 102 as the negative image of the electrode 200'. The hexagonal channels 250 also provide electrolyte through openings at the machining face 234 of the electrode tool 200'.

FIG. 3 illustrates a cutaway view of the electrode tool 200 of FIG. 2A according to exemplary embodiments of the disclosure. A dielectric coating 258 can be disposed on all surfaces of the electrode 200. The dielectric coating 258 can be disposed on all surfaces of the electrode 200 except the erosion or machining face 204 to improve precision. The dielectric coating 258 can prevent machining activity (chemical activity) in those areas where it is disposed, preventing electrochemical removal, and confining work piece 102 erosion to the face 204 of the cathode 200. Confining work piece 102 erosion to the face 204 of the cathode 200 reduces the possibility of creating tapered slots and/or pins, and also increases machining efficiency. For example, the width of a slot can vary by less than 20% along the slot depth, for example, less than 15%, less than 10%, less than 5%, even less than 2%. In some instances, the width of the slot does not vary along the slot depth. The slot depth is not particularly limited. In exemplary embodiments for forming an extrusion die, the slot depth can be, for example, from inches to thousandths of an inch. For example, the slot depth can be greater than 0.010 inch, greater than 0.05 inch, greater than 0.1 inch, or even greater than 0.5 inch.

Since the cathode 104 does not wear appreciably in the pECM process, the inside of the cathode 104 can be machined away to create an open chamber 254, or provide for a flow chamber whereby electrolyte is introduced. The flow chamber may be unobstructed or baffles (not shown) disposed in the flow chamber may provide electrolyte flow direction to uniformly distribute electrolyte to the channels.

The dielectric coating 258 can be disposed on all surfaces of the electrode 200 except the erosion or machining face 204. For example, the dielectric coating 258 can be disposed on at least a portion of an inner wall of the cathode 200 channel 224, 228, and an outer wall. For example, the dielectric coating 258 can be disposed on the cathode walls 208 to within 2 mm or less of the machining face 204, for example, within 1 mm or less, within 100 μm or less, within 50 μm or less or even within 20 μm or less. According to some of these embodiments, the dielectric coating 258 can be disposed on the cathode walls 208 to within a distance "d" of the distal end, wherein the outer wall 209 and the inner wall 211 define a wall thickness "t" at the distal end, and the ratio d/t<0.5, for example, d/t<0.1.

Figure 4:
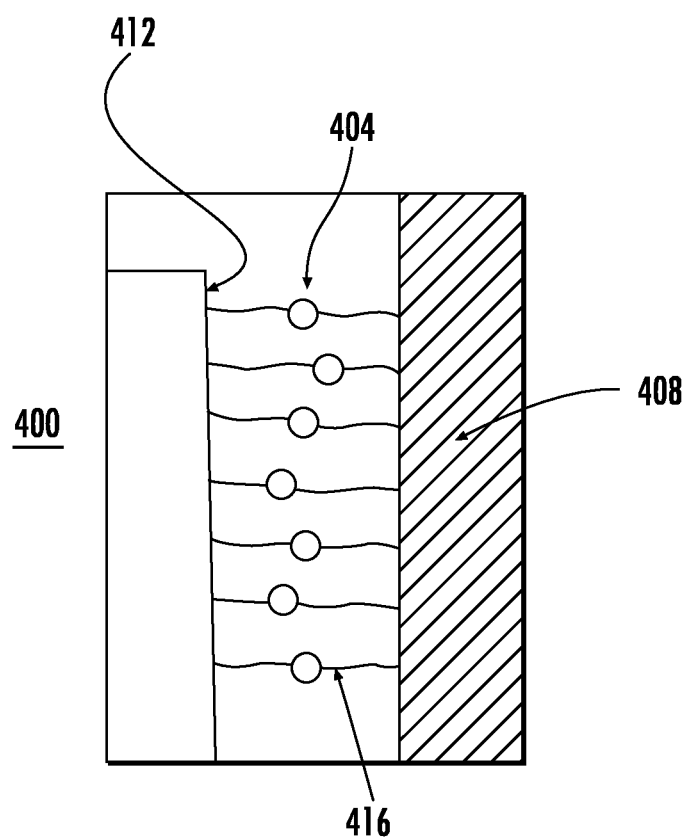
FIG. 4 presents a schematic of the pulsed electrochemical machining process.

FIG. 4 presents a schematic of undesirable electrochemical removal referred to herein as secondary electrochemical removal during the pulsed electrochemical machining process 400. Electrolyte ions 404 between the cathode sidewall 408 and the work piece cause pin tapering or slot tapering 412 from the secondary electrochemical removal 416. Secondary electrochemical removal 416 occurs at the cathode 104 sidewall 408 instead of at the erosion face, while the desired electrochemical removal occurs at the erosion face. The dielectric coating 258 can prevent secondary electrochemical removal 416 according to exemplary embodiments.

In general, materials for tool electrodes 104 provide low material loss to maintain consistent shape and provide consistent machined slot and/or pin shapes in the work piece 102. Cathode materials are conductors of sufficient strength and can include, but are not limited to, stainless steels, copper, bronze, aluminum, titanium, copper-tungsten, and tungsten carbide. Cathode configurations may be fabricated using conventional machining, wEDM, pEDM, photochemically-machined (PCM) sheets that are either supported by an additively-manufactured support or diffusion bonded into a structure of sufficient strength, and the like, or combinations thereof.

Figure 5:
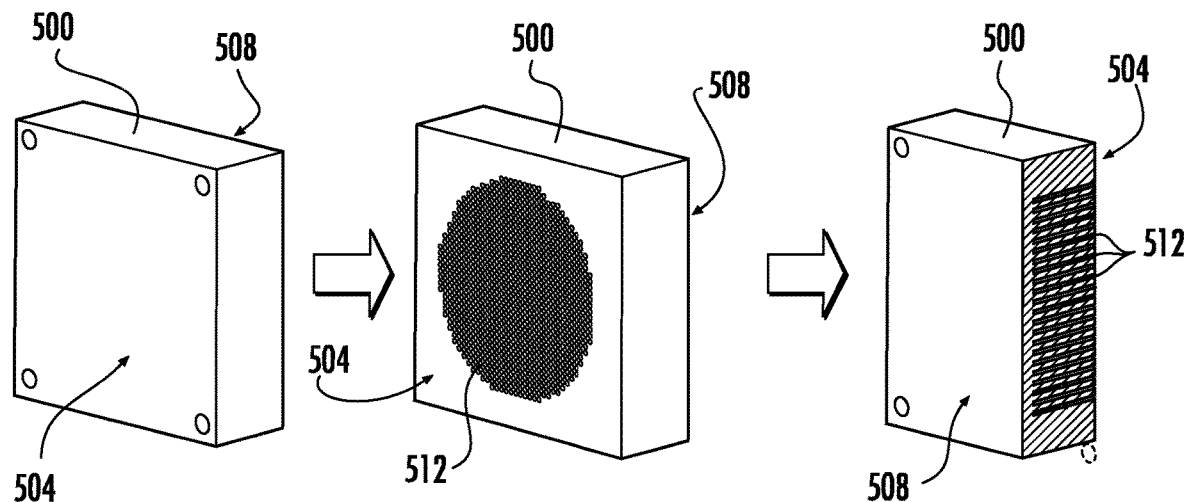
FIG. 5 shows a schematic perspective view of forming holes on one side of a metal plate in a process of forming a die according to exemplary embodiments of the disclosure.

FIG. 5 shows a schematic perspective view of forming holes on one side of a metal plate or die blank 500 in a process of forming a die according to exemplary embodiments of the disclosure. The die blank 500 may have a back surface 504 and a front surface 508. Generally plasticized batch flows through a finished die from the back surface to the front surface. A network of holes 512 may be drilled in the back surface 504 as shown in FIG. 5 toward the front surface. These holes are feed holes to feed batch to matrix slots around matrix pins and optionally to feed peripheral slots for forming skin of an extruded body. The pECM 100 may be used to drill feed holes 512. The die blank 500 having feed holes 512 may be the work piece anode 102 in the pECM 100 according to exemplary embodiments. Slots may be pECM machined on the front surface 508.

Figure 6:
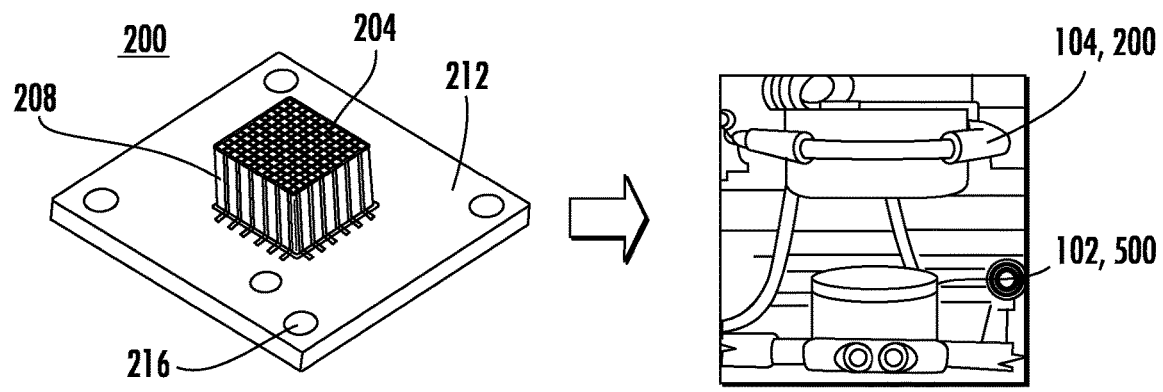
FIG. 6 shows a schematic perspective view of an electrode tool and a metal plate in a pulsed electrochemical machining apparatus in a process of forming a die according to exemplary embodiments of the disclosure.

FIG. 6 shows a schematic perspective view of an electrode tool 200 and a metal plate 500 in a pulsed electrochemical machining apparatus 100 in a process of forming a die according to exemplary embodiments of the disclosure. The electrode tool 200 can be the cathode 104 and the die blank 500 having feed holes 512 may be the anode 102 in the electrolytic cell 106 of the pECM apparatus 100.

Figure 7:
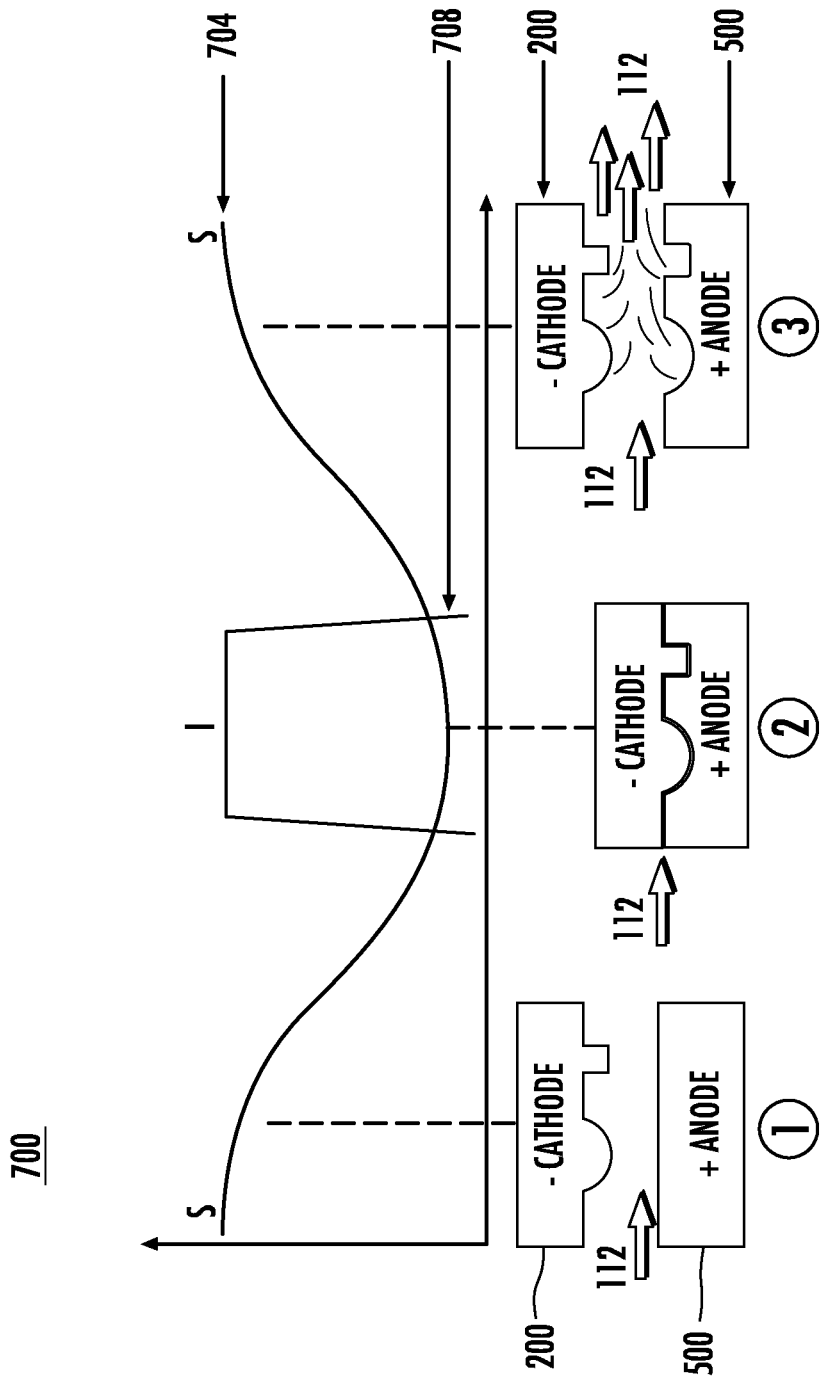
FIG. 7 is a schematic diagram of a method to machine a metal plate in a pulsed electrochemical machining apparatus according to exemplary embodiments of the disclosure.

FIG. 7 is a schematic diagram of a method 700 to machine the anode 102 work piece or die blank 500 front surface 508 in a pECM apparatus according to exemplary embodiments. The proximate distance between the cathode 200 and anode 500 is represented by graphical curve 704, for example, as electrode tool path. A current pulse is represented by graphical curve 708. At operation or step "1" in the pECM cycle, cathode 200 and anode 500 are spaced apart by "S" when the working gap is opened and fresh electrolyte 112 is flowed to the gap. At "2" the electrodes 200, 500 approach each other to the working distance (minimum distance), for example, about 10 μm and a controlled DC pulse is released represented by current pulse 708. The current pulse 708 is not particularly limited and can be a single full length pulse, multiple high frequency pulses that total the single full length pulse, and the like, or combinations thereof. The distance between the cathode 200 and anode 500 over time is represented by cyclical path "S", however, path "S" is not particularly limited and can be sinusoidal as shown or, for example, stepwise (not shown) or other path shape that opens the gap between the electrodes 200, 500 to allow fresh electrolyte 112 to flow to the gap and brings the electrodes 200, 500 together to the working distance.

At operation "3" the electrodes 200, 500 are separated as electrolyte 112 flushes reaction products from the gap. The cycle repeats at a frequency (for example, 60 Hz) until the desired features are machined into the work piece 500. For example, the cathode 200 can advance at each cycle cutting a consistent narrow cavity having very little taper, the cathode 200 can return to a common position at each cycle to cut a wide cavity such as a divot, or a combination of a slot and a divot can be machined by controlling the progression of the cathode 200 at each cycle into the work piece 500. Other features can be similarly machined such as a plenum, for example, from a feedhole toward a slot.

The electrolyte can be basic in nature or acidic in nature. The electrolyte can be salt based of slightly basic nature, for example, sodium nitrate or sodium chloride. The electrolyte can be acidic, for example, sulfuric acid or nitric acid. Acidic electrolyte may chew away (erode/corrode) all materials.

Figure 8A:
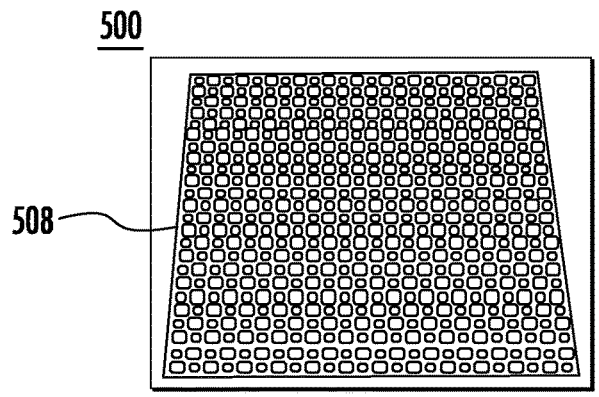
FIG. 8A is a perspective view of results of pulsed electrochemical machining method showing example slots according to exemplary embodiments of the disclosure.
Figure 8B:
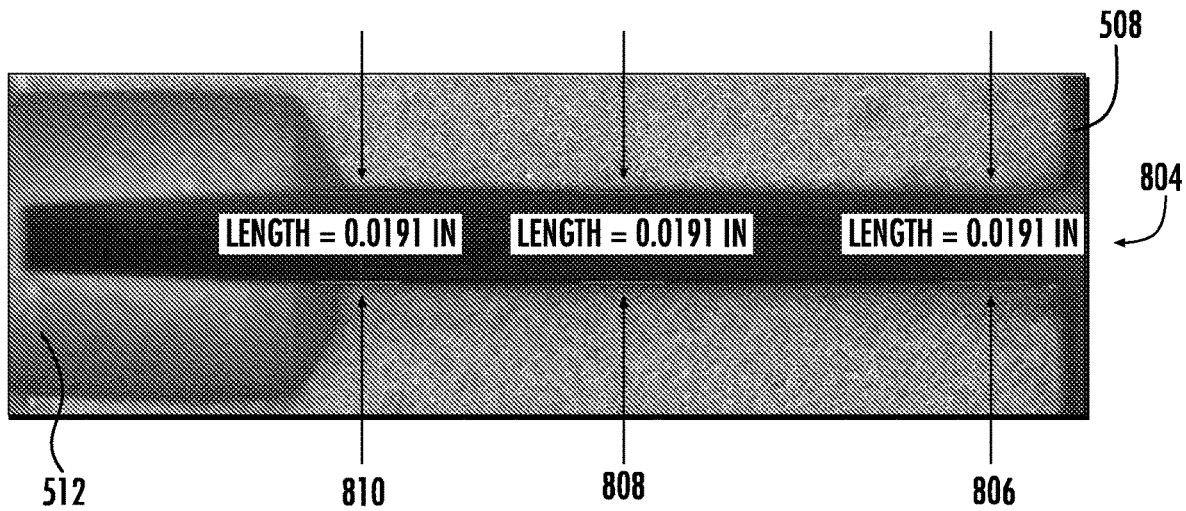
FIG. 8B is a cross section view through a die after the pulsed electrochemical machining method showing a slot from the front surface and a hole from the back surface according to exemplary embodiments of the disclosure.

FIG. 8A is a perspective view of results of pulsed electrochemical machining method showing example slots according to exemplary embodiments of the disclosure. Slots forming small and large pins pECM machined into the front face 508 of die blank 500 are shown in FIG. 8A. FIG. 8B is a cross section view through a die after the pulsed electrochemical machining method showing a slot 804 from the front surface 508 and a feed hole 512 from the back surface 504 according to exemplary embodiments of the disclosure. Slot 804 exhibits little to no taper. The slot width measured at 806 near the front surface 508 was 0.0191 in (0.0485 cm), at half depth 808 the slot width was also 0.0191 in (0.0485 cm), and near the bottom of the slot 810, at the intersection with the feed hole 512, the slot width was also 0.0191 in (0.0485 cm).

Figure 8C:
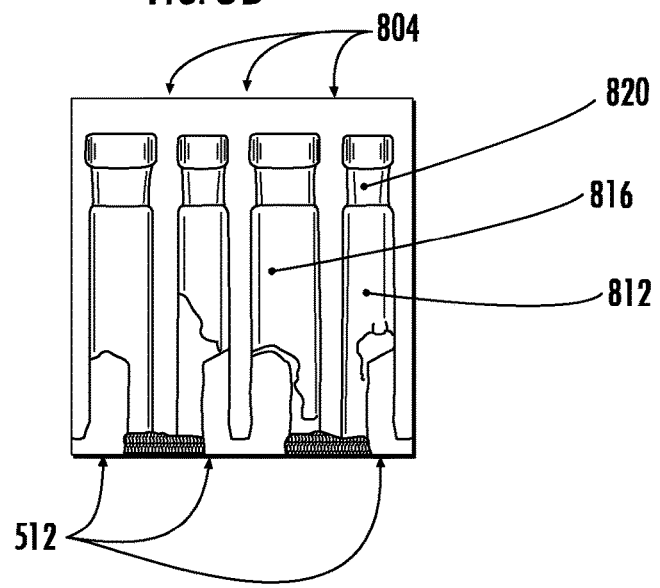
FIG. 8C is a cross section view through a die after the pulsed electrochemical machining method showing pins formed between slots from the front surface and holes meeting the slots from the back surface according to exemplary embodiments of the disclosure.

FIG. 8C is a cross section view through a die after the pulsed electrochemical machining method showing small pins 812 and large pins 816 formed between slots 804 from the front surface 508 and holes 512 meeting the slots from the back surface 504 according to exemplary embodiments of the disclosure. Geometric features 820 such as divots were machined on pin sides 812, 816 using the pECM techniques as shown in FIG. 8C. The dielectric coating 258 limits machining to the face of the cathode and therefore improves slot taper, increases machining efficiency and provides a controlled process of constant current over the depth of the slot according to exemplary embodiments of the disclosure.

According to exemplary embodiments of the disclosure, the coating 258 disposed on at least a portion of the cathode walls 208 can have a high resistivity, for example, the ability to block about 95% of electrical flow. For example, the ability to block about 99% of electrical flow. The coating 258 can have a thickness of 50 µm or less and survive 4-15 volts and greater than 300 amps/cm². For example, the coating can have a thickness of less than 10 µm, less than 5 µm, less than 2 µm, less than 1.5 µm, less than 1 µm, or even less than 50 nm. For example, the coating can have a thickness of between about 2 µm and 20 µm, between 50 nm and 50 µm, or even between 0.1 µm and 10 µm. When the coating is too thick, there may be mechanical interference between the coating and the surfaces of the slot or when the coating is too thick, there may be rounding in the corners of the pins by rounding the corners of the tool. For example, the insulating coating should have a high resistivity (highly electrically insulating), be able to be applied to the cathode walls to be disposed thereon without significantly interfering with the dimensions of the cathode while maintaining sufficient insulating properties. The coating 258 can have the ability to be applied to cellular structure (non-line of sight application), such as dip coating of a polymer, and to survive high flow rate of sodium nitrate solution (30-60 L/min), for example, 8% sodium nitrate in deionized (DI) water at pH of 7 to 8. The coating 258 and the cathode 200 can have the ability to strip or reapply coating. The coating 258 can have uniform thickness, ability to coat the electrode uniformly, have good adhesion to the electrode material and surface. For example, the electrode may be produced by EDM and have an EDM surface finish. According to further exemplary embodiments, the coating 258 may be applied at low temperature (for example, not more than 100° C.), be free of pin holes and cracks, resistant to electrical breakdown, and resistant to wear. The resistance to wear includes chemical and abrasive wear resistance to the corrosive effects of flowing electrolyte under certain pressure impinging upon the coating 258.

According to some of these exemplary embodiments, the electrically insulating properties of the coating 258 can be expressed as having a dielectric constant greater than 0 and less than or equal to 25. For example, the dielectric constant can be greater than 0 and less than or equal to 12, greater than 0 and less than or equal to 8, greater than 0 and less than or equal to 5, greater than 0 and less than or equal to 3, or even greater than or equal to 2 and less than or equal to 12.

Exemplary embodiments of coating materials include polymers, for example, acrylics, epoxy resins, poly olefin, parylene, polyurethanes, silicones, siloxanes, polyimides, fluorocarbons, benzocyclobutenes, p-polyxylylenes, unsaturated polyesters, alkyd polyesters, polyvinyls, phenolics, polyamides, polysulfones, polyaryletheretherketone, polybutylene terephthalate, polynorbornenes, polystyrene, polyethylene, polypropylene, composites and nanocomposites, and combinations thereof.

Acrylics can include polymethylmethacrylates (PMMA), for example, and acrylics can be incorporated with other polymers to alter properties. Polyurethanes can include types 1-6 polyurethanes. Silicones can include, for example, methyl silicone, phenyl silicone, phenyl-methyl silicone. Siloxanes can include, for example, polysiloxanes, dimethyl siloxane, methyl phenyl siloxane, methyl vinyl siloxane, methylphenylvinyl siloxane, fluoromethylvinyl siloxane. Polyimides can include, for example, pyromellitic dianhydride (PMDA) and oxydianiline (ODA). Fluorocarbons can include, for example, polytetrafluoroethylene (PTFE), poly (ethylene-co-tetrafluoroethylene) (ETFE), chlorotrifluoroethylene (CTFE), etc. Benzocyclobutenes can include, for example, cyclotene. P-polyxylylenes can include, for example, parylene types C, N, D, and HT. Unsaturated Polyesters: Unsaturated polyesters are cured by cross-linking long linear chains by means of vinyl monomers such as styrene, diallylphthalate, methylmethacrylate, vinyl toluene, divinyl benzene, and the like. Alkyd polyesters can include, for example, paints, varnishes, insulation coatings, corrosion-protective coatings for metals, and the like. Polyvinyls can include, for example, polyvinyl chlorides (PVC) and polyvinyl formal (Formvar), for example, polyvinyl alcohol (PVA), polyvinyl butyral (PVB), etc. Polyamides can include, for example, nylon. Copolymerisation can include, for example, combining polyimide with polysiloxane to produce a dielectric material. Composites and nanocomposites can include, for example, polyimide-ceramic composites, that is, adding metal oxide (alumina, titania, and the like, and combinations thereof) to polyimide to create a dielectric material).

Exemplary embodiments of coating materials include non-polymers, for example, boron nitride, amorphous carbon, diamond-like carbon (DLC), aluminum nitride, silicon nitride, amorphous silicon, silicon dioxide (silica), porous silicon, anodized aluminum, aluminum oxide (alumina), anodized titanium, titanium oxide (titania), and the like, and combinations thereof. Boron Nitride can be soluble in alkaline molten salts and nitrides such as NaOH—$Na_2CO_3$, $NaNO_3$, $Li_3N$, $Mg_3N_2$. Aluminum nitride can resist molten salt attack. Silicon nitride can be used as a dielectric and can be chemical vapor deposition (CVD) disposed on at least a portion of the cathode walls 208. Amorphous silicon can be modified (modified amorphous silicon) to decrease the dielectric constant.

Exemplary embodiments of coating materials can include amorphous silicon, fluoropolymer coatings with high dielectric strength, thermal spray of ceramic oxide or polymer coatings, plasma electrolytic oxidization that provides super hard anodizing (Al, Mg, Ti), and the like. Deposition can be by dipping, spray, electrostatic, fluidized bed, chemical vapor deposition (CVD), plasma vapor deposition (PVD), vacuum deposition, and the like.

According to these exemplary embodiments, the coating 258 can include the coating materials as described herein and combinations of one or more of these coating materials, such as in a multilayer of these coating materials. The multilayer may comprise a base layer of coating material or combination of coating materials disposed on the cathode wall 208 and one or more additional layers of coating material or combination of coating materials disposed on the base layer. For example, the base layer may provide greater adherence to the cathode wall 208 than the additional layer. The additional layer may provide greater resistance to deleterious effects of the electrolyte or greater electrical resistivity than the base layer. The additional layer may adhere better to the base layer than to the cathode wall 208. The multilayer can be comprised of a base layer having a different structure and/or composition than the additional layer. For example, the base layer of the multilayer may have a crystalline structure and the additional layer may have an amorphous structure. For example, the base layer of the multilayer may comprise a first composition and the additional layer may comprise a second composition.

Examples

Figure 9A:
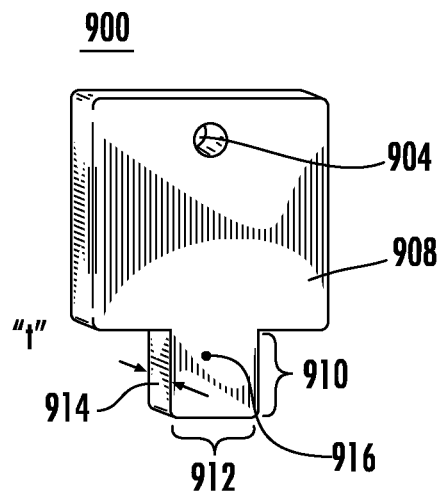
FIG. 9A is a side view schematic diagram of a cathode tool and FIG. 9B is a top view schematic diagram of an anode part used in testing Examples in the pulsed electrochemical machining method and apparatus according to exemplary embodiments of the disclosure.

The disclosure is further described below with respect to certain exemplary and specific embodiments thereof, which are illustrative only and not intended to be limiting. In accordance with some of the examples, a series of test cathode tools and test work pieces were prepared to machine a slot in the test work piece using a pECM apparatus 100 according to exemplary embodiments of the disclosure. FIG. 9A shows an example cathode 900. Several materials for the example cathode 900 were tested, such as 420 stainless steel and tungsten carbide (WC). The example cathode 900 included a mounting hole 904 for mounting in the pECM apparatus 100, a base 908, and an extension 916 to simulate a cathode wall 208 as described above, for example, with reference to FIG. 3. The extension has a height 910, a width 912, and a thickness 914.

Figure 9B:
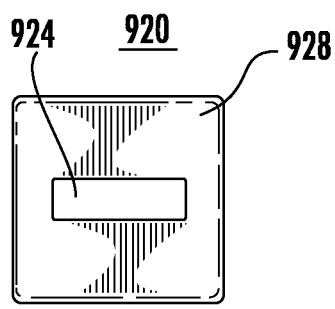
Figure 9C:
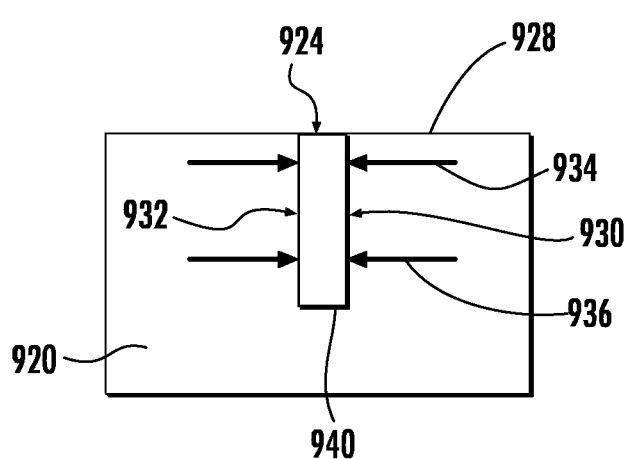
FIG. 9C is a schematic side view of an example slot in the anode part of FIG. 9B according to exemplary embodiments of the disclosure.

FIGS. 9B and 9C show a top view and side cross section view, respectively, of an example work piece 920. Several materials for the example work piece anode 920 were tested, such as stainless steel. The example anode 920 included a slot 924 machined from a top surface 928. The width of the slot between slot side surfaces 930 and 932 was measured proximate the top surface 928 at location 934 and proximate the bottom of the slot 940 at 936 to determine a taper from width 934 to width 936.

Example test parameters using a pECM apparatus as described above are given in Table 1.

TABLE 1

|  | Tool Material | | | | | |
| --- | --- | --- | --- | --- | --- | --- |
|  | Stainless Steel | | | Tungsten Carbide | | |
|  | Test 1 | Test 2 | Test 3 | Test 1 | Test 2 | Test 3 |
| Voltage (volts) | 6.5 | 7.0 | 7.4 | 6.5 | 7.0 | 7.4 |
| Velocity (mm/min) | 0.05 | 0.08 | 0.09 | 0.05 | 0.08 | 0.09 |
| Pulse Freq (msec) | 1.3 | 1.7 | 2.1 | 1.3 | 1.7 | 2.1 |
| Overcut (in/μm) | 0.0011/27.9 | 0.0023/57.2 | 0.0035/88.9 | 0.0012/30.5 | 0.0022/55.9 | 0.0031/78.7 |

Table 2 provides the Example dielectric coatings disposed on Example cathodes of 420 stainless steel and WC. Modified amorphous silicon was modified to decrease the dielectric constant.

TABLE 2

| Example dielectric coatings: |
| --- |
| Uncoated Baseline |
| Diamond-Like Coating (DLC) |
| Anodized Aluminum & Selective Plate Face |
| Parylene |
| Alumina |
| Amorphous Silicon |
| Modified Amorphous Silicon (w/ Si base coating) |
| Modified Amorphous Silicon (w/o Si) |
| Anodized Grade 1 Ti |
| Polysiloxane |
| Aluminum Oxide |

Figure 10:
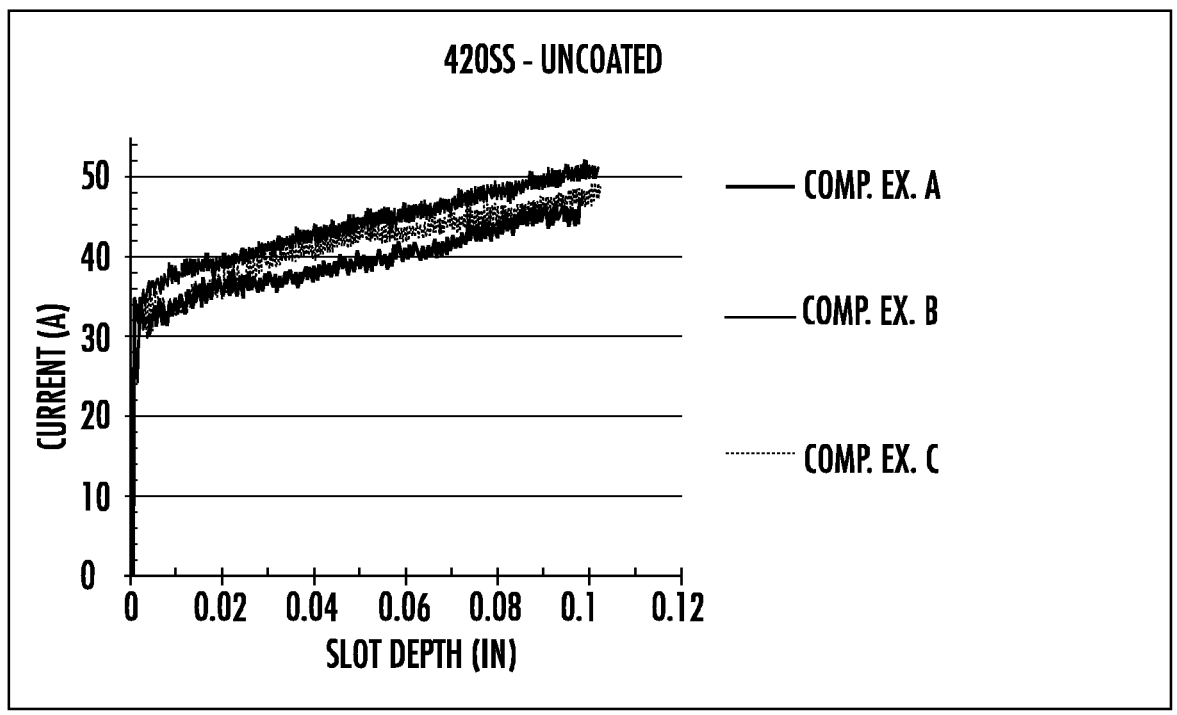
FIG. 10 presents a graphical plot of data of electrical output characteristics for Comparative Examples as slot depth is increased in the pulsed electrochemical machining method and apparatus according to exemplary embodiments of the disclosure.

FIG. 10 presents a graphical plot of data of electrical output characteristics for Comparative Examples A, B, and C as slot depth is increased in the pulsed electrochemical machining method and apparatus according to exemplary embodiments of the disclosure. As the slot depth increased for these uncoated 420 stainless steel samples, the current rose dramatically. The rise in current is indicative of slot tapering 412 from secondary electrochemical removal 416.

Figure 11:
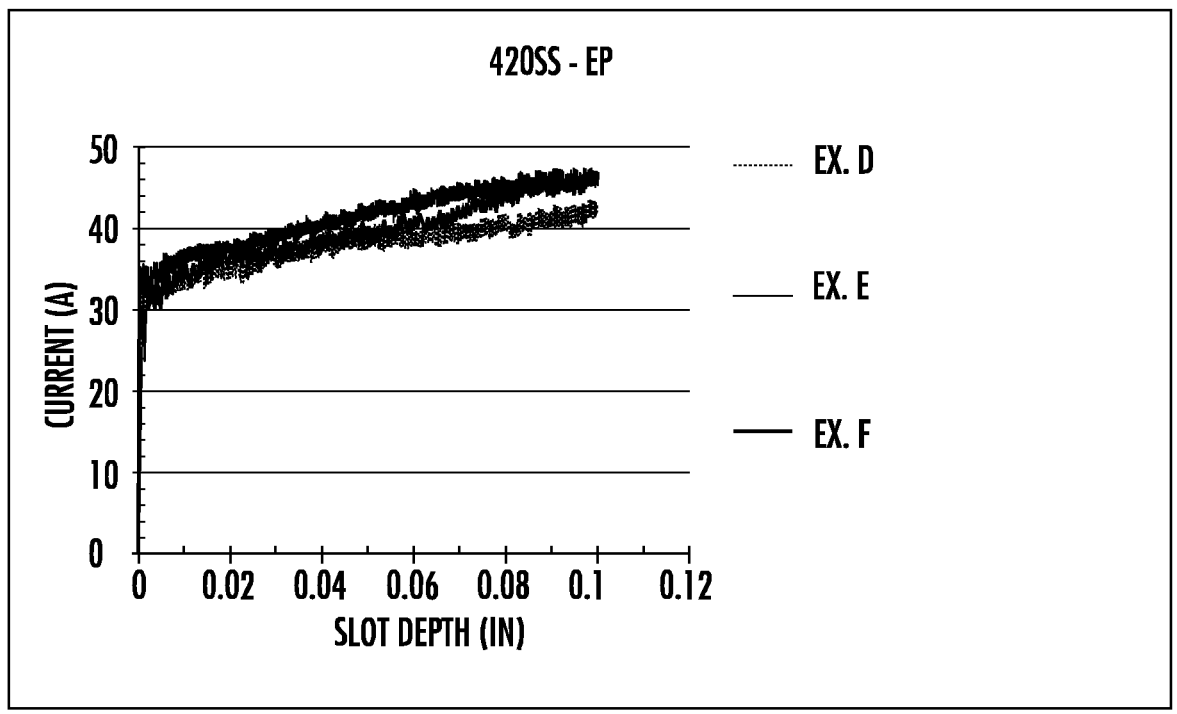
FIG. 11 presents a graphical plot of data of electrical output characteristics for Examples as slot depth is increased in the pulsed electrochemical machining method and apparatus according to exemplary embodiments of the disclosure.

FIG. 11 presents a graphical plot of data of electrical output characteristics for Examples D, E, and F as slot depth is increased in the pulsed electrochemical machining method and apparatus according to exemplary embodiments of the disclosure. Examples D, E, and F were coated with polysiloxane. Slot tapering was not as severe as in the uncoated Comparative Examples but the polysiloxane did not adhere well to the cathode as shown in FIGS. 12 and 13. FIG. 12 is a side view of an Example cathode tool 1200 after coating wall 1216 with a polysiloxane 1218 layer and before testing in the pulsed electrochemical machining method and apparatus according to exemplary embodiments of the disclosure. The erosion face 1212 is indicated at the lower portion of the cathode tool 1200 and is not coated. FIG. 13 is a side view of the Example cathode tool of FIG. 12 after testing 1300 in the pulsed electrochemical machining method and apparatus according to exemplary embodiments of the disclosure. As is evident from the Figure, the wall 1316 has lost the coating 1318 exposing wall 1316 to an area 1342 proximate erosion face 1312 susceptible to secondary electrochemical removal 416 that can cause slot taper in agreement with the data of FIG. 11.

Figure 14:
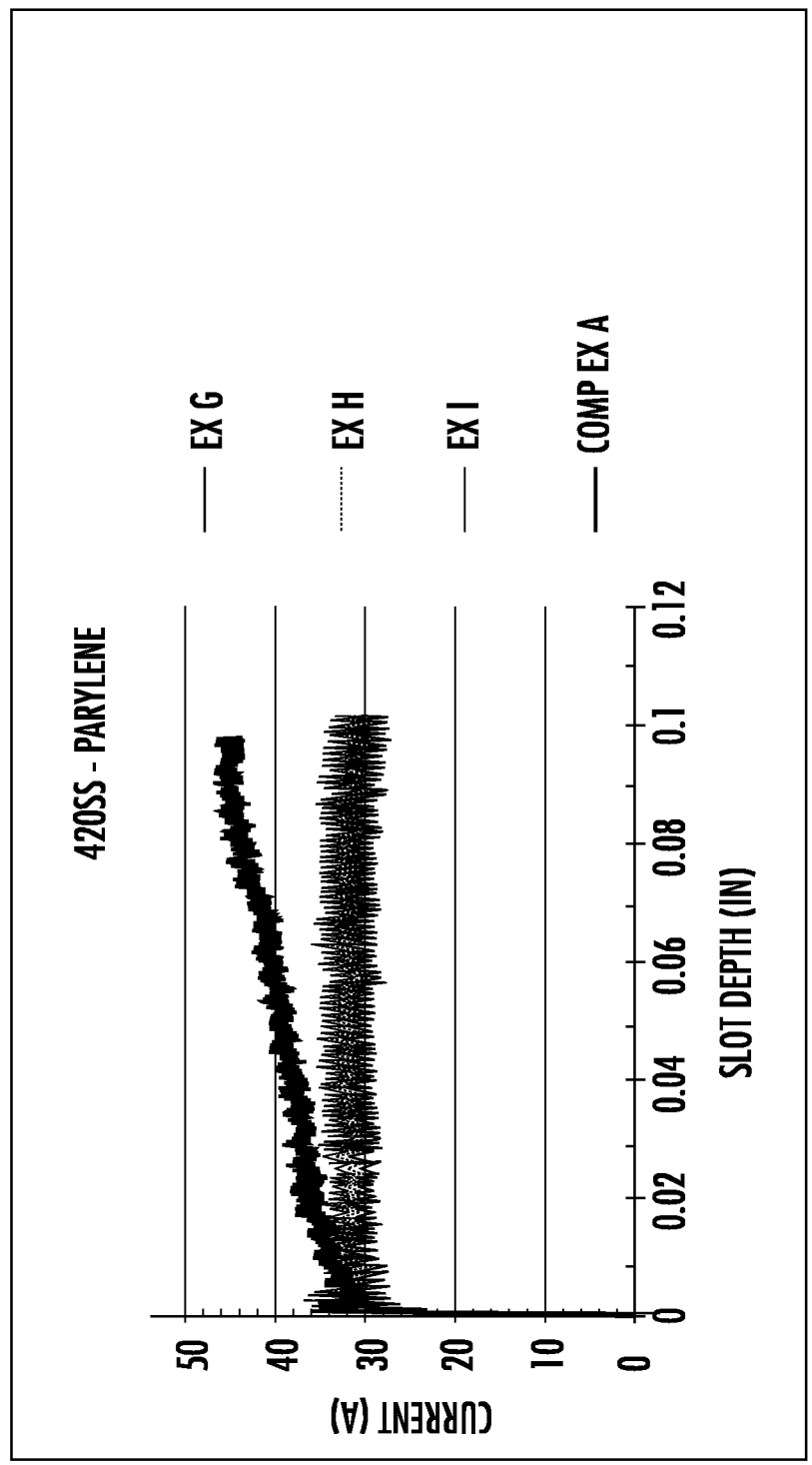
FIG. 14 presents a graphical plot of data of electrical output characteristics for Examples and a Comparative Example as slot depth is increased in the pulsed electrochemical machining method and apparatus according to exemplary embodiments of the disclosure.

FIG. 14 presents a graphical plot of data of electrical output characteristics for Examples G, H, and I and a Comparative Example A as slot depth is increased in the pulsed electrochemical machining method and apparatus according to exemplary embodiments of the disclosure.

Figures 15, 16:
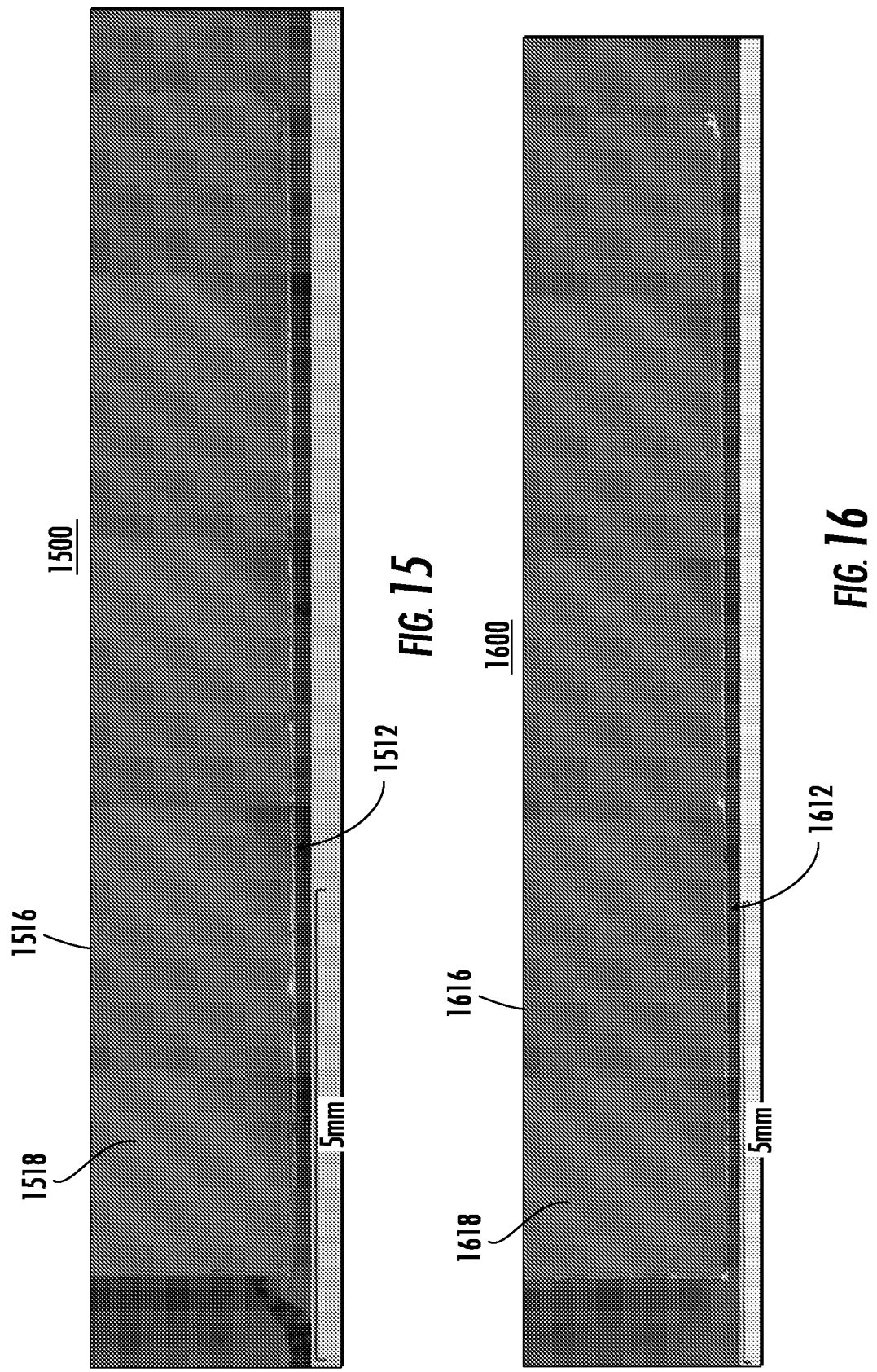
FIG. 15 is a side view of an Example cathode tool after coating and before testing in the pulsed electrochemical machining method and apparatus according to exemplary embodiments of the disclosure.
FIG. 16 is a side view of the Example cathode tool of FIG. 15 after testing in the pulsed electrochemical machining method and apparatus according to exemplary embodiments of the disclosure.

FIG. 15 is a side view of an Example cathode tool 1500 after coating and before testing in the pulsed electrochemical machining method and apparatus according to exemplary embodiments of the disclosure. The Example cathode 1500 had a coating of parylene 1518 disposed on wall 1516 with no coating disposed on erosion face 1512.

FIG. 16 is a side view of the Example cathode tool of FIG. 15 after testing 1600 in the pulsed electrochemical machining method and apparatus according to exemplary embodiments of the disclosure. As is evident from the Figure, the wall 1616 maintained the coating 1618 near the erosion surface 1612. The dielectric coating 1618 provided protection from secondary electrochemical removal that can cause slot taper in agreement with the data of FIG. 14. The nearly constant current with slot depth observed for the three Examples indicates the coating appears to be blocking side wall current in the cathode. Table 3 shows the slot taper of Comparative Examples A, B, and C compared to the relatively little to no slot taper of the Examples G, H, and I according to exemplary embodiments of the disclosure.

TABLE 3

| Example | Slot Taper (inch) |
|---|---|
| A (Comparative) | 0.0015 |
| B (Comparative) | 0.0015 |
| C (Comparative) | 0.002 |
| G | 0.0001 |
| H | 0.0 |
| I | 0.0002 |

Advantages of the apparatus and methods of pECM provided in accordance with the present disclosure include surface finish of the feature being produced is not covered with re-melted material, enabling reduced extrusion pressure. Exemplary embodiments of the disclosure provide a reusable, non-consumed, cathode, saving the cost of remaking expensive plunge EDM electrodes in the shape of the grooves to be cut. Geometric features can be machined on pin sides using pECM, enabling the production of higher-strength honeycombs that can be processed using shortened firing cycles, improving efficiencies and reducing manufacturing costs. Exemplary embodiments of the disclosure provide a method and apparatus where no metallurgical changes occur in the base metal, enabling improved surface finish quality and better wear coating adherence which leads to increased production throughput due to better honeycomb geometric accuracy and uniformity. Exemplary embodiments of the disclosure also provide improved production efficiencies due to electrically-insulating coating on the cathode that prevents secondary electrochemical removal and specifically confines machining activity to improve extrusion die geometric accuracy resulting in better honeycomb geometric accuracy and uniformity. The disclosed apparatus and methods provide efficient and economical machining of hardened alloys since material removal is achieved through dissolution, not physical removal. Another advantage of the apparatus and methods of pECM provided in accordance with the present disclosure is that no micro-cracking occurs, preventing crack initiation or other failure mechanisms in the work piece.

It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Reference throughout this specification to exemplary embodiments and similar language throughout this specification may, but do not necessarily, refer to the same embodiment. Furthermore, the described features, structures, or characteristics of the subject matter described herein with reference to an exemplary embodiment may be combined in any suitable manner in one or more exemplary embodiments.

It will be apparent to those skilled in the art that various modifications and variations can be made in the present disclosure without departing from the spirit or scope of the disclosure. Thus, it is intended that the appended claims cover the modifications and variations of this disclosure provided they come within the scope of the appended claims and their equivalents.

The invention claimed is:

1. A pulse electrochemical machining (pECM) electrode tool to machine extrusion die cavities, the electrode tool comprising:
   a base;
   a plurality of intersecting walls, bounded by an outer wall and an inner wall, wherein the outer wall and the inner wall extend from the base to a distal end and wherein the plurality of intersecting walls are only located at the distal end;
   an electrically insulating layer disposed on side surfaces of the inner wall, the outer wall, and the plurality of intersecting walls;
   an erosion face comprising a cross section of the inner wall, the outer wall, and the plurality of intersecting walls exposed through the electrically insulating coating at the distal end;
   a plurality of channels formed by the plurality of intersecting walls at the distal end; and
   an electrolyte chamber defined by the inner wall, the electrolyte chamber extending from a back surface of the base through the base to the plurality of channels at the distal end, such that the channels provide a conduit for electrolyte from the electrolyte chamber through openings in the channels at the distal end.

2. The electrode tool of claim 1, wherein the plurality of channels comprising cross sections of at least one of squares, rectangles, hexagons, circles, ellipses, other polygons, and combinations thereof.

3. The electrode tool of claim 1, wherein the electrically insulating layer comprises at least one of parylene, amorphous silicon, modified amorphous silicon with silicon base coating, modified amorphous silicon without silicon base coating, Polysiloxane, and metal oxide coatings.

4. The electrode tool of claim 1, wherein the electrically insulating layer is between 50 nm and 50 µm thick.

5. The electrode tool of claim 1, wherein the electrically insulating layer is between 0.1 µm and 10 µm thick.

6. The electrode tool of claim 1, wherein the electrically insulating layer comprises a base layer adhered to the plurality of intersecting walls such that the electrically insulating layer is resistant to electrical breakdown, and resistant to wear.

7. The electrode tool of claim 1, wherein the electrically insulating layer covers the inner wall, the outer wall, and the plurality of intersecting walls to within 2 mm or less of the erosion face.

8. The electrode tool of claim 7, wherein the electrically insulating layer covers the inner wall, the outer wall, and the plurality of intersecting walls to within 1 mm or less of the erosion face.

9. The electrode tool of claim 1, wherein the electrically insulating layer covers the inner wall, the outer wall, and the plurality of intersecting walls to within 100 µm or less of the erosion face.

10. The electrode tool of claim 1, wherein the electrically insulating coating covers the inner wall, the outer wall, and the plurality of intersecting walls to within a distance "d" of the distal end, wherein the outer wall and the inner wall define a wall thickness "t" at the distal end, and the ratio $d/t<0.5$.

11. The electrode tool of claim 10, wherein the ratio $d/t<0.1$.

* * * * *